United States Patent
Salam et al.

(10) Patent No.: US 9,553,945 B2
(45) Date of Patent: Jan. 24, 2017

(54) SEMANTIC DATA BROKER FOR DYNAMIC ASSOCIATION BETWEEN DEVICES AND APPLICATIONS

(71) Applicant: Cisco Technology, Inc., San Jose, CA (US)

(72) Inventors: Samer Salam, Vancouver (CA); Lionel Florit, Greenbrae, CA (US)

(73) Assignee: Cisco Technology, Inc., San Jose, CA (US)

(*) Notice: Subject to any disclaimer, the term of this patent is extended or adjusted under 35 U.S.C. 154(b) by 218 days.

(21) Appl. No.: 14/174,376

(22) Filed: Feb. 6, 2014

(65) Prior Publication Data

US 2015/0222490 A1 Aug. 6, 2015

(51) Int. Cl.
*G06F 15/173* (2006.01)
*H04L 29/08* (2006.01)
*H04L 12/24* (2006.01)

(52) U.S. Cl.
CPC .......... *H04L 67/2809* (2013.01); *H04L 41/00* (2013.01); *H04L 41/12* (2013.01)

(58) Field of Classification Search
CPC ........ H04L 41/00; H04L 41/12; H04L 67/303; H04L 67/2809; H04W 8/18
USPC ................................................. 709/223–226
See application file for complete search history.

(56) References Cited

U.S. PATENT DOCUMENTS

| | | | |
|---|---|---|---|
| 6,941,291 B1 | 9/2005 | Zoller et al. | |
| 9,069,570 B2* | 6/2015 | Asai | G06F 9/4411 |
| 2004/0039829 A1* | 2/2004 | Bucher | H04L 67/1095 |
| | | | 709/226 |
| 2008/0177896 A1 | 7/2008 | Quinn et al. | |
| 2008/0320303 A1 | 12/2008 | Khalid et al. | |
| 2009/0307337 A1* | 12/2009 | Marshall | H04L 67/303 |
| | | | 709/224 |
| 2012/0105201 A1 | 5/2012 | Sanders | |
| 2012/0105214 A1 | 5/2012 | Sanders | |
| 2012/0158875 A1* | 6/2012 | Almeida | H04L 67/42 |
| | | | 709/223 |
| 2014/0075004 A1* | 3/2014 | Van Dusen | H04L 41/04 |
| | | | 709/223 |
| 2014/0280690 A1* | 9/2014 | Allen | H04L 41/00 |
| | | | 709/223 |

OTHER PUBLICATIONS

"Machine-to-Machine Communications (M2M); Functional Architecture", ETSI TS 102 690, V1.2.1, Jun. 2013, 279 pages, European Telecommunications Standards Institute, Sophia Antipolis Cedex, France.

* cited by examiner

*Primary Examiner* — Bharat N Barot
(74) *Attorney, Agent, or Firm* — Parker Ibrahim & Berg LLC; James M. Behmke; Stephen D. LeBarron (57) ABSTRACT

In one embodiment, a broker device receives device-identifying data to identify a device in a computer network. An ontology associated with the device-identifying data is then identified by the broker device and in response to identifying the ontology, interpretation instructions related to the identified ontology are determined. The broker device receives data from the identified device and interprets the received data based on the interpretation instructions.

20 Claims, 6 Drawing Sheets

SEMANTIC DATA BROKER FOR DYNAMIC ASSOCIATION BETWEEN DEVICES AND APPLICATIONS

TECHNICAL FIELD

The present disclosure relates generally to computer networks, and, more particularly, to establishment of dynamic associations between devices and applications and dynamic device discovery.

BACKGROUND

Internet of Things (IoT) networks or Internet of Everything (IoE) networks (e.g., often Low power and Lossy Networks (LLNs)), have a myriad of applications, such as sensor networks, Smart Grids, and Smart Cities. In IoE networks, devices are connected over a computer network to provide data to or from an environment. In particular, applications are capable of exposing data within an environment. However, such exposure requires the applications themselves to manage the data being sent from different types of devices without any policy constraints or interpretation instructions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a broker device receives device-identifying data to identify a device in a computer network and identifies an ontology that is associated with the device-identifying data. In response to identifying the associated ontology, the broker device determines interpretation instructions related to the identified ontology. The broker device then receives data from the identified device and interprets the received data based on the interpretation instructions.

According to one or more additional embodiments, a server (e.g., an ontology server) receives device-identifying data from a broker device and determines an ontology and associated interpretation instructions based on the device-identifying data. The server then provides the ontology and the associated interpretation instructions to the broker device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). In addition, a Mobile Ad-Hoc Network (MANET) is a kind of wireless ad-hoc network, which is generally considered a self-configuring network of mobile routers (and associated hosts) connected by wireless links.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or powerline communication (PLC) networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
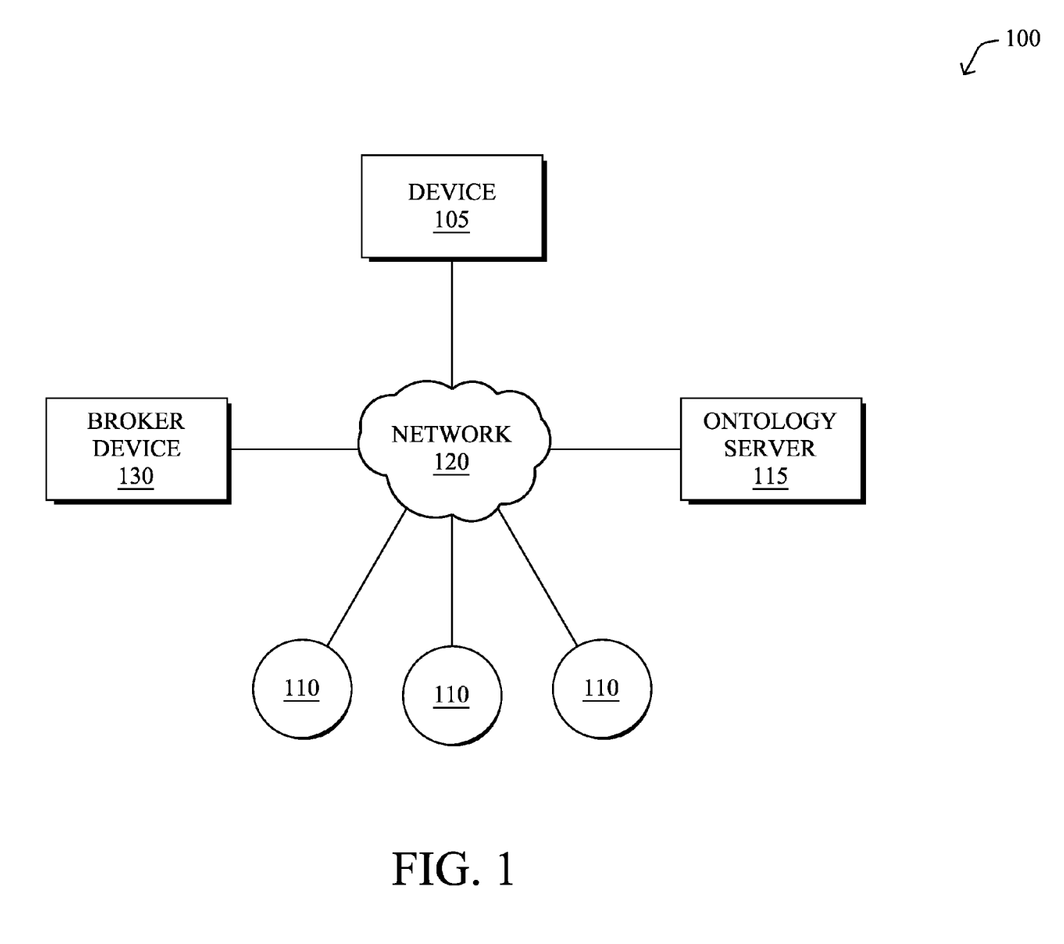
FIG. 1 illustrates an example computer network.

FIG. 1 is a schematic block diagram of an example (and simplified) computer network 120 illustratively comprising various interconnected network devices (e.g., servers, routers, etc.) which may form local networks that are interconnected by a global network (e.g., the public Internet). Illustratively, a device 105, a broker device 130, an ontology server 115, and various applications 110 may be interconnected with the network 120 (and/or within respective local networks). Those skilled in the art will understand that any number of devices may be implemented in the computer network 120, that the network devices may be interconnected with one another in any suitable configuration, and that the view shown herein is for simplicity.

Figure 2:
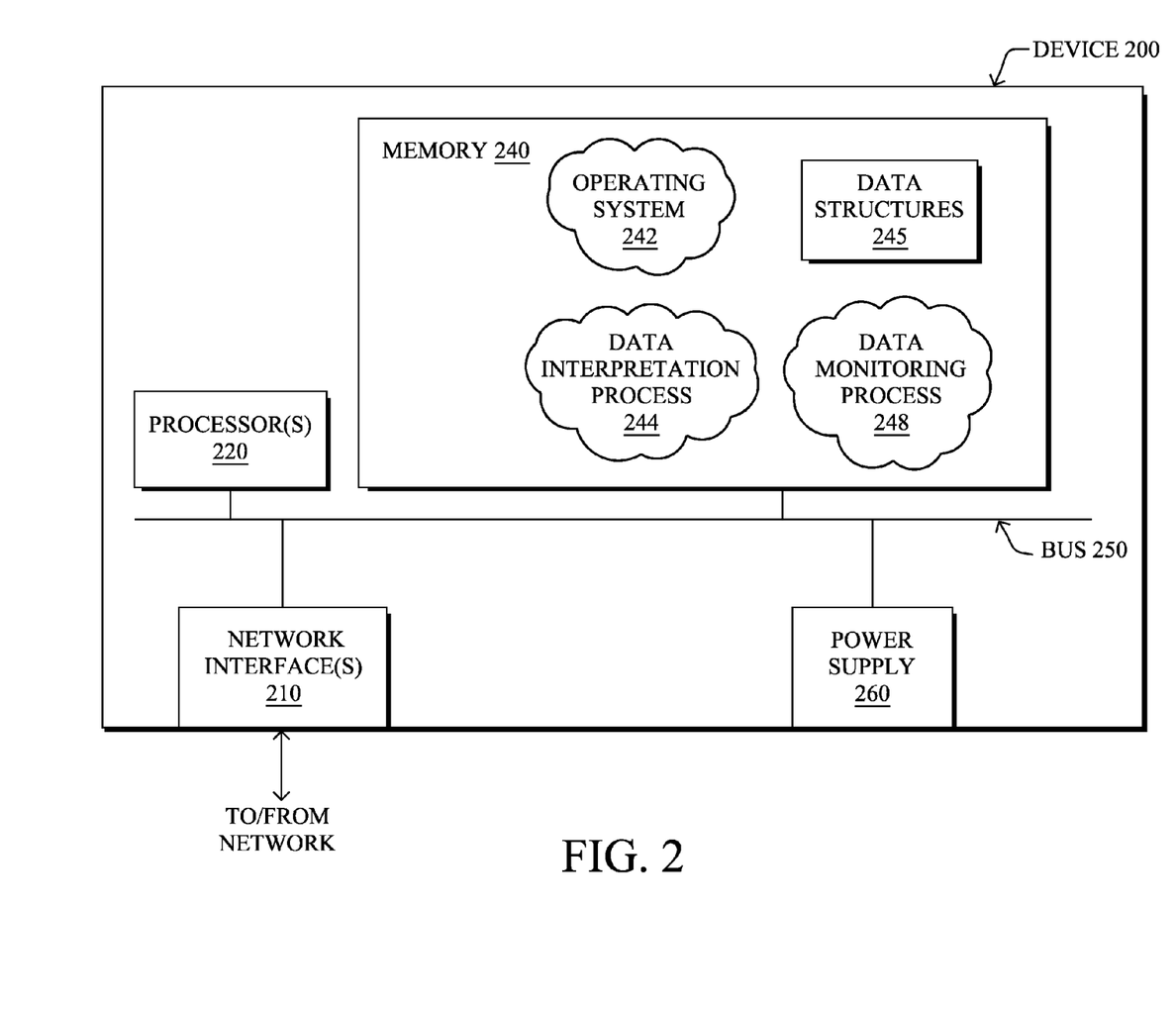
FIG. 2 illustrates an example device.

FIG. 2 is a schematic block diagram of an example device 200 that may be used with one or more embodiments described herein, such as a broker device 130 or server 115. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.). The network interface(s) 210 contain the mechanical, electrical, and signaling circuitry for communicating between the elements coupled to the network 120. The network interfaces may be configured to transmit and/or receive data using a variety of different communication protocols. While the network interface 210 is shown separately from power supply 260, the network interface 210 may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device 200 by, inter alia, invoking operations in support of software processes and/or services executing on the device 200. These software processes and/or services may comprise, illustratively, a data interpretation process 244, and a data monitoring process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, the terms "Internet of Things" or "Internet of Everything" (or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

The interconnection of devices is made using a hardware component, a device, which may attach to an object or may be part of an object environment to monitor the environment. The device allows the objects to be part of the digital world by mediating the interactions. The actual software component that provides information on the objects or enables controlling of the device is a resource. As implementations of resources can be highly dependent on the underlying hardware of the device, a service provides a standardized interface, offering functionality for interacting with objects and related processes. The services expose the functionality of a device by accessing hosted resources. The relationship between services and objects are modeled as associations which may be static (e.g., when the device is embedded into the object) or dynamic (e.g., when a device from the environment is monitoring a mobile object). Further, services may be associated simultaneously with multiple objects and the valid associations between objects and resources may change dynamically over time. Dynamic associations may be handled in a server infrastructure such as a cloud, where communication and computing resources are plentiful.

As further noted above, data received from multiple devices is typically managed by an application and device association is typically based on queries as opposed to being policy based. Certain methods have been proposed for association of devices based on location proximity, but such methods are limited to location based associations and utilize limited network connectivity models.

Dynamic Data Interpretation and Monitoring

The techniques herein provide a method for establishing dynamic associations between devices and applications and dynamic device discovery based on application rules. Specifically, according to one or more embodiments of the disclosure as described in detail below, a broker device receives device-identifying data to identify a device in a computer network and a server identifies and provides the broker device with an ontology that is associated with the device-identifying data. In response to identifying the associated ontology, the broker device determines interpretation instructions related to the identified ontology. The broker device then receives data from the identified device and interprets the received data based on the interpretation instructions.

Illustratively, the techniques described herein may be performed by hardware, software, and/or firmware, such as in accordance with the data interpretation process 244, and the data monitoring process 248, which may contain computer executable instructions executed by the processor 220 to perform functions relating to the techniques described herein.

Operationally, under the illustrative control of data interpretation process 244, broker device 130 interprets raw data received from a device based on an ontology related to the device's identifying data and provides the interpreted data to one or more applications "on demand" (e.g., based on a request from the applications), as described in detail below.

Figure 3:
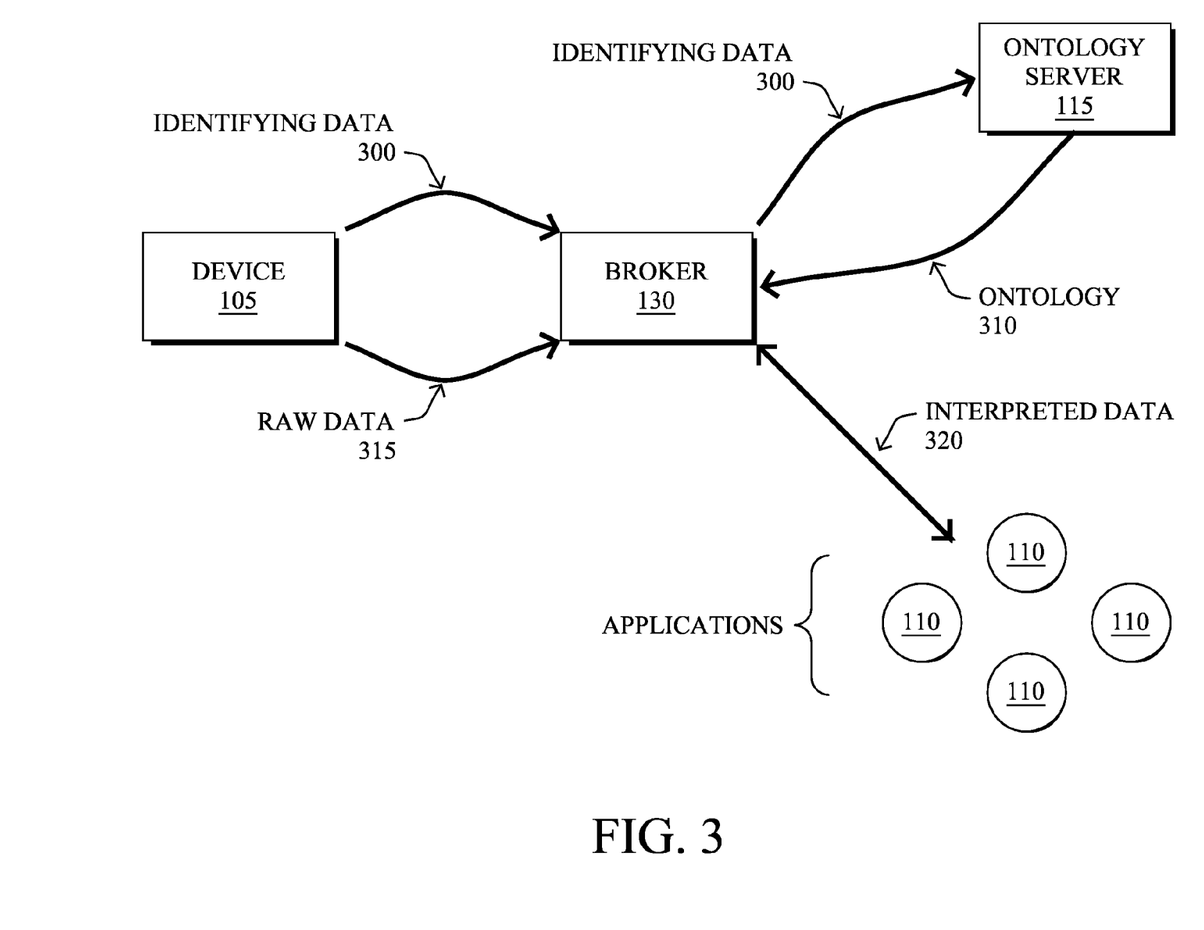
FIG. 3 illustrates an example view of data communication.

For instance, in one embodiment, as illustrated in FIG. 3, the broker device 130 may receive identifying data 300 from a device 105 in a computer network. Identifying data may generally be defined as information that identifies a particular device, i.e., differentiating it from other devices in a manner that indicates exactly what (and possibly where) the device is. Examples of such identifying data may include, e.g., device media access control (MAC) addresses, unique identifiers (e.g., names), unique IP addresses, unique web addresses, and so on, as well as various generally identifying information, such as non-unique device types, non-unique device classes, locations, etc.

In response to receiving the identifying data 300 or in an on-demand fetch manner, the broker device 130 may connect to a server (e.g., an ontology server) 115 to identify an ontology 310 that is associated with the device-identifying data 300. In particular, an ontology of a device defines such things as what the device is, how the device operates, and what data the device provides. For example, an ontology describes, based on the identifying information (e.g., a simple numerical address or name), whether the device is a smoke detector made by manufacturer A, or a tire pressure sensor in a car made by manufacturer B.

Once the server 115 has received the device-identifying data and has associated it with a particular ontology 310, the server may also determine particular interpretation instructions that are associated with the particular ontology. Interpretation instructions, for example, define particular rules that can be used by the broker device 130 to translate (interpret) raw data 315 received from a particular device 105 into application-usable data, such as converting "10110101" from a temperature sensor made by manufacturer X to "70 degrees", while converting that same "10110101" raw data for a temperature sensor made by manufacturer Y to "75 degrees."

The server 115 may transmit the ontology 310 together with associated interpretation instructions to the broker device 130, allowing the broker device to interpret the received raw data 315, in order to provide that interpreted data 320 to one or more applications 110. For instance, the one or more applications 110 may pull (request on demand) the interpreted data 320 from the broker device 130 once the raw data 315 has been interpreted. Alternatively, the broker device 130 may push (send unsolicited) the interpreted data 320 to the applications 110 based on configuration (e.g., registration by one or more particular applications).

In particular, the broker device 130 may fetch an ontology 310 per device 105 based on identifying data 300 from a plurality of devices and may interpret the raw data 315 from each device based on the respective associated ontologies. Then, the broker device 130 may present the interpreted data 320 to one or more applications 110 irrespective of device specifics (e.g., device type, device vendor, device manufacturer, etc.). In other words, the broker device 130 is able to associate unrelated applications and data independently of origin or network communications being used. Notably, the broker device 130 may be a distributed system that runs on an IoE Gateway, on a switch or router within the network or on a general compute node such as a server. The applications 110 residing on devices 105, embedded within Gateways/routers/switches or connected over for example, a cloud network, may register with the broker device 130 to exchange the interpreted data 320. In addition, the device 105 may be, as described herein, a sensor, a communication device, a computer, or the like.

As a specific example, the device broker 130 may be placed within a network where it would receive temperature-related data from a plurality of temperature sensors (note that a broker device 130 need not be pre-configured with the type of data it would receive/interpret). A first temperature sensor may be associated with a conference room within a building and may be configured to measure the temperature of the conference room. The first temperature sensor may connect to the broker device by, for example, a constrained application protocol (CoAP) service, and provides identifying information of the sensor, which may include additional information such as location (e.g., sensor in the conference room). The broker device may then connect to a server to load the device ontology associated with the first temperature sensor. The device ontology provides the broker device with instructions on how to interpret the temperature measurements from the first temperature sensor. As an example, the interpretation instructions related to the device ontology may instruct that each instance of a temperature reading from the first temperature sensor should be interpreted as $T=R*0.932$, where R is the reading value measured by the sensor and T is the temperature in degrees Fahrenheit.

A second temperature sensor, from a different manufacturer than the first temperature sensor, may have a different representation of temperature data. For example, the device ontology associated with the second temperature sensor may include instructions for the broker device to interpret each temperature reading as $T=R/3+34$. Accordingly, based on each device ontology, the broker device is provided with information on how to interpret different representations of data from various devices and provide an application with standardized format data.

Furthermore, applications may demand more than merely a temperature reading. For example, an application may demand from a device, a temperature measurement taken at a specific time of day. Accordingly, when the broker device receives a temperature measurement from a temperature sensor, the broker device may tag the measurement with a timestamp. In other words, the broker device may create various categories for measurements taken by the same temperature sensor.

In another embodiment, under the illustrative control of data monitoring process 248, the broker device 130 may monitor the data received from the identified device to update the interpreted data in response to determining an update. In other words, the broker device 130 may actively monitor the dynamic data associated with applications 110 as the data changes over time and may continuously provide the applications 110 with current (e.g., updated) interpreted data. Note also that the broker device, if so configured and capable, may provide further processed data to applications, such as data trends, data reports, aggregated data, alarms, threshold indications, and so on.

Figure 4:
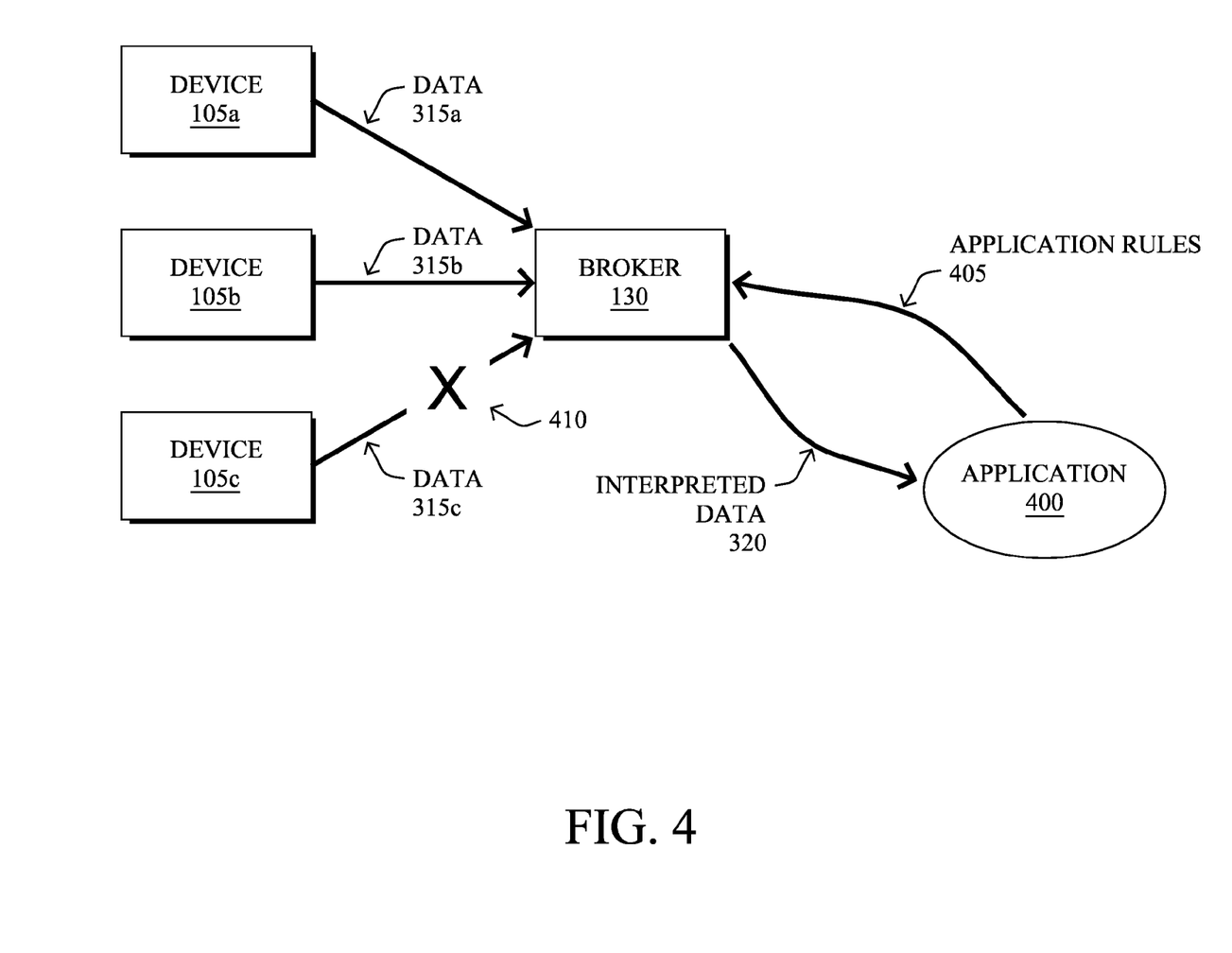
FIG. 4 illustrates an example of data monitoring and application association.

Additionally, as illustrated in FIG. 4, the monitoring process 248 may also include an association and disassociation between devices and applications. In particular, as shown in FIG. 4, the broker device 130 may receive data 315 (e.g., 315a-315c) from a plurality of different devices 105a-105c and interprets the data based on an identified ontology per each device. Moreover, the broker device 130 may receive one or more application rules 405 for a particular application 400. The interpreted data 320 from the one or more devices (105a-105c) of the computer network may then be monitored. In response to monitoring the data, given devices of the one or more devices 105a-105c that are being monitored may be either associated or disassociated with the particular application 400 based on the application rules 405 and the monitored interpreted data 320. FIG. 4 illustrates, as an example, one device (e.g., 105c) that has been disassociated from the particular application 400 based on monitored data. The interpreted data 320 from the devices that have been associated (e.g., associated devices 105a and 105b) with the particular application 400, may then be pushed to the particular application.

As an example of association and disassociation, the broker device 130 may monitor the location of a device 105 and when the context of the data changes such that the interpreted data 320 no longer meets the application rules 405, the device 105 may be disassociated from the particular application 400. For instance, the application rules 405 may include a policy regarding a proximity range and when a device 105 is outside of that proximity range, the broker device 130 may disassociate that device from the particular application 400. Similarly, when the broker device 130 detects that a device 105 is within the proximity range, the broker device 130 may associate the detected device with the particular application 400 based on the application rules 405.

This association and disassociation process may be used for various applications such as targeted advertising, mobile-to-large-screen display interaction, and the like. In the location proximity example, the broker device may receive interpretation instructions regarding oil level in vehicles within a predetermined proximity range. When vehicles are detected with oil levels below a predetermined threshold, advertisements for local service stations may be pushed to the vehicles via particular applications. Accordingly, multiple devices may be dynamically associated and disassociated to particular applications as the interpreted data is monitored by a broker device. Therefore, the broker device may facilitate temporal communication between devices, or between a device and one or more applications based on particular criteria or rules (e.g., current location, time zone, resource availability, etc.).

Figure 5:
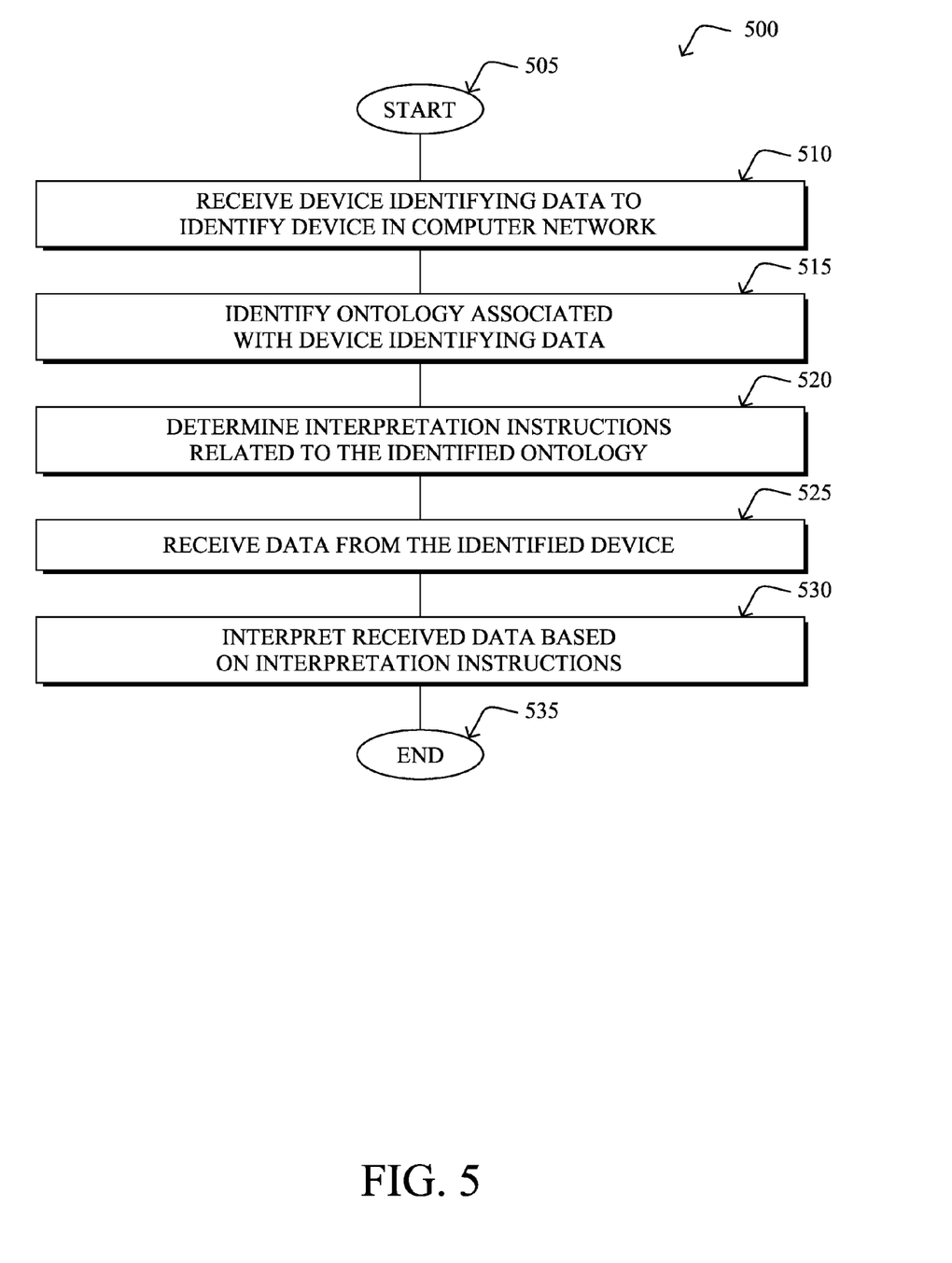
FIGS. 5-6 illustrate an example simplified procedure for dynamically interpreting data by the broker device based on interpretation instructions.

FIG. 5 illustrates an example simplified procedure 500 for dynamically interpreting data by the broker device based on interpretation instructions in accordance with one or more embodiments described herein. The procedure 500 may start at step 505, and continues to step 510, where, as described in greater detail above, a broker device may receive device-identifying data to identify a device in a computer network. In step 515, the broker device may identify an ontology that is associated with the device-identifying data and determine, in step 520, interpretation instructions that are related to the identified ontology (such as by requesting it from a server, or else by determining that the broker has already stored the ontology and/or instructions, such as from pre-configuration or previous server inquiry). Further, in step 525, the broker device may receive data from the identified device and interprets the received data from the device in step 530 based on the interpretation instructions. The procedure may then illustratively end in step 535.

Figure 6:
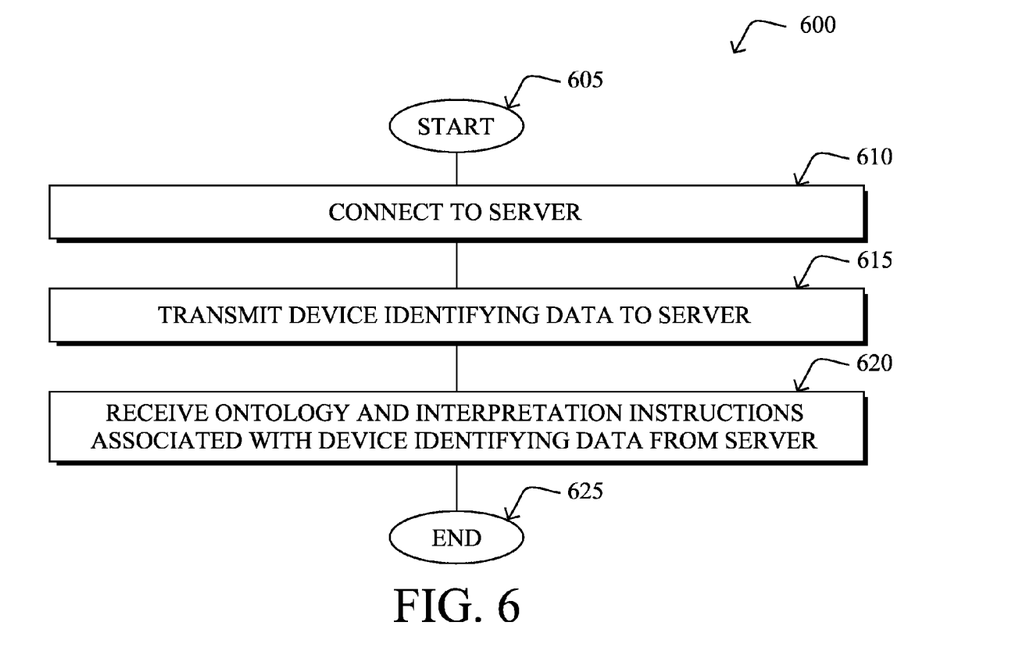

In addition, FIG. 6 illustrates another example simplified procedure 600 for dynamically interpreting data by the broker device based on interpretation instructions in accordance with one or more embodiments described herein. The example simplified procedure 600, e.g., as an expansion of steps 515 and 520 in FIG. 5, may begin at step 605, and continues to step 610, where as described in greater detail above, the broker device may connect to a server (e.g., an ontology server) and transmits the device-identifying data, in step 615, to the server. The broker device may then, in step 620, receive an ontology and interpretation instructions associated with the device-identifying data from the server. The procedure may then illustratively end in step 625.

Figure 7:
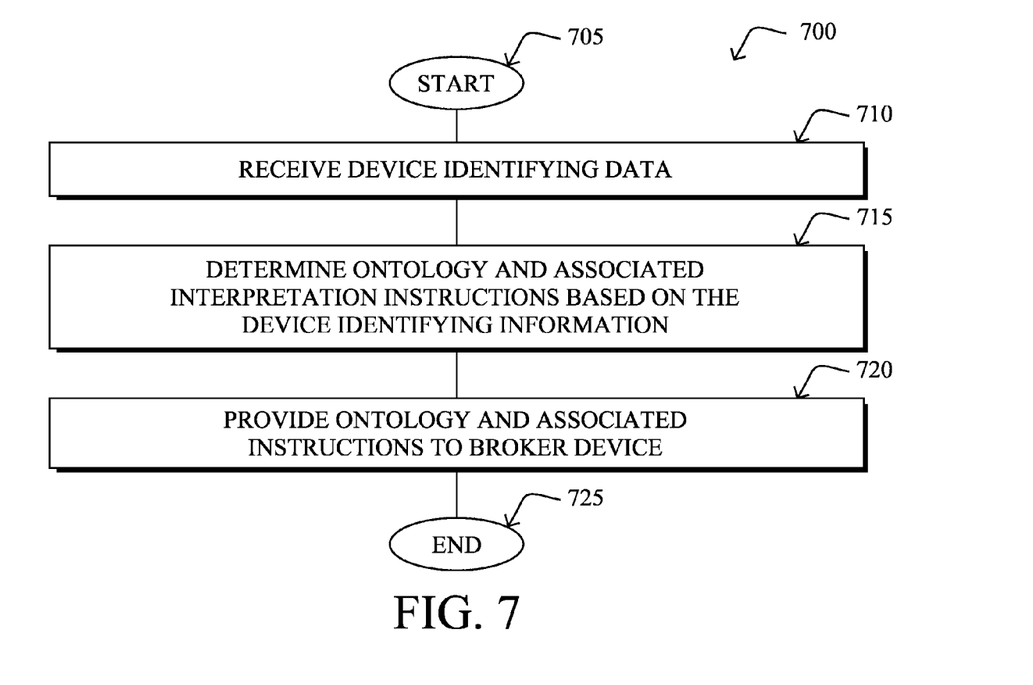
FIG. 7 illustrates an example simplified procedure for dynamically providing ontology and interpretation instructions to a broker device.

In particular, FIG. 7 illustrates an example simplified procedure 700 for dynamically providing ontology and interpretation instructions to a broker device, in accordance with one or more embodiments described herein, from the perspective of a server. The illustrative procedure 700 may start at step 705, and continues to step 710, where, as described in more detail above, a server may receive device-identifying information. In step 715, the server may thus determine an ontology and associated interpretation instructions based on the device-identifying information and may, in step 720, provide the ontology and associated instructions to a broker device. The procedure may illustratively end in step 725.

It should be noted that while certain steps within procedures 500-700 may be optional as described above, the steps shown in FIGS. 5-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-700 are described separately, certain steps from each procedure may be incorporated into each other procedure, and the procedures are not meant to be mutually exclusive.

The techniques described herein, therefore, provide for dynamic association between devices and applications and dynamic device discovery. In particular, the techniques herein dynamically interpret data based on fetched interpretation instructions and provide data to applications based on particular application rules (e.g., spatial, temporal, etc.). The techniques, therefore, allow diverse data to be interpreted, independent of origin or network communication, into a standard format and to be provided to an application on demand.

While there have been shown and described illustrative embodiments that provide for dynamic association of devices and applications in a computer network, it is to be understood that various other adaptations and modifications may be made within the spirit and scope of the embodiments herein. For example, the embodiments have been shown and described herein with device-to-device association or device-to-application association. However, the embodiments in their broader sense are not as limited, and may, in fact, be used with device-to-cloud association.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a broker device, device-identifying data to identify a device in a computer network;
in response to receiving device-identifying data, identifying, the broker device by communicating with a server, an ontology associated with the device-identifying data, wherein the ontology defines at least what kind of data the device provides;
receiving, at the broker device, the identified ontology and associated interpretation instructions for that ontology from the server, wherein the interpretation instructions instruct the broker device on how to interpret data received from the device at the broker device;
receiving, at the broker device, data from the identified device;
interpreting, by the broker device, the received data from the device based on the interpretation instructions; and
applying, by the broker device, the interpreted data to an associated application accordingly.

2. The method of claim 1, wherein receiving the ontology and the interpretation instructions includes:
connecting to a server; and
transmitting the device-identifying data to the server.

3. The method of claim 2, further comprising:
transmitting the interpreted data to one or more applications embedded on the server.

4. The method of claim 1, further comprising:
transmitting the interpreted data to one or more applications.

5. The method of claim 1, further comprising:
storing the ontology locally when the ontology is not previously stored.

6. The method of claim 1, further comprising:
monitoring the data received from the identified device; and
updating the interpreted data in response to determining an update.

7. The method of claim 6, further comprising:
providing the updated data to one or more applications.

8. The method of claim 1, further comprising:
receiving one or more application rules for a particular application;

monitoring interpreted data from one or more devices of the computer network;

associating or disassociating given devices of the one or more devices with the particular application based on the one or more application rules and the monitored interpreted data; and pushing interpreted data from one or more associated devices to the particular application based on the one or more application rules.

9. The method of claim 1, wherein the device is selected from a group consisting of: a sensor, a communication device, and a computer.

10. An apparatus, comprising:
one or more network interfaces to communicate with a computer network;
a processor coupled to the network interfaces and configured to execute one or more processes; and
a memory configured to store a process executable by the processor, the process when executed operable to:
receive device-identifying data to identify a device in the computer network;
in response to receiving device-identifying data, identify an ontology associated with the device-identifying data, wherein the ontology defines at least what kind of data the device provides;
receive the identified ontology and associated interpretation instructions for that ontology from the server, wherein the interpretation instructions instruct the apparatus on how to interpret data received from the device at the apparatus;
receive data from the identified device; and
interpret the received data from the device based on the interpretation instructions to an associated application; and
apply the interpreted data to an associated application accordingly.

11. The apparatus of claim 10, wherein the process when executed is further operable to:
connect to a server; and
transmit the device-identifying data to the server.

12. The apparatus of claim 11, wherein the process when executed is further operable to:
transmit the interpreted date to one or more applications embedded on the server.

13. The apparatus of claim 10, wherein the process when executed is further operable to:
transmit the interpreted data to one or more applications.

14. The apparatus of claim 10, wherein the process when executed is further operable to:
store the ontology locally when the ontology is not previously stored.

15. The apparatus of claim 10, wherein the process when executed is further operable to:
monitor the data received from the identified device; and
update the interpreted data in response to determining an update.

16. The apparatus of claim 15, wherein the process when executed is further operable to:
provide the updated data to the one or more applications.

17. The apparatus of claim 10, wherein the process when executed is further operable to:
receive one or more application rules for a particular application;
monitor interpreted data from one or more devices of the computer network;
associate or disassociate given devices of the one or more devices with the particular application based on the one or more application rules and the monitored interpreted data; and
push interpreted data from one or more associated devices to the particular application based on the one or more application rules.

18. The apparatus of claim 10, wherein the device is selected from a group consisting of: a sensor, a communication device, and a computer.

19. A method, comprising:
receiving, at a network interface of an ontology server, from a broker device, device-identifying data to identify a device in a computer network;
determining, by a processor on the network device, an ontology and associated interpretation instructions based on the device-identifying information, wherein the ontology defines at least what kind of data the device provides and the associated interpretation instructions instruct the broker device how to interpret data received from the device; and
transmitting, by the processor, the ontology and the associated interpretation instructions to the broker device, wherein the broker device interprets received data from the device based on the interpretation instructions and applies the interpreted data to an associated application accordingly.

20. The method of claim 19, further comprising:
receiving interpreted data from the broker device for use by one or more embedded applications.

* * * * *